No. 828,635. PATENTED AUG. 14, 1906.
N. R. BEAUCHAMP.
AIR BRAKE SYSTEM.
APPLICATION FILED APR. 20, 1906.
2 SHEETS—SHEET 1.
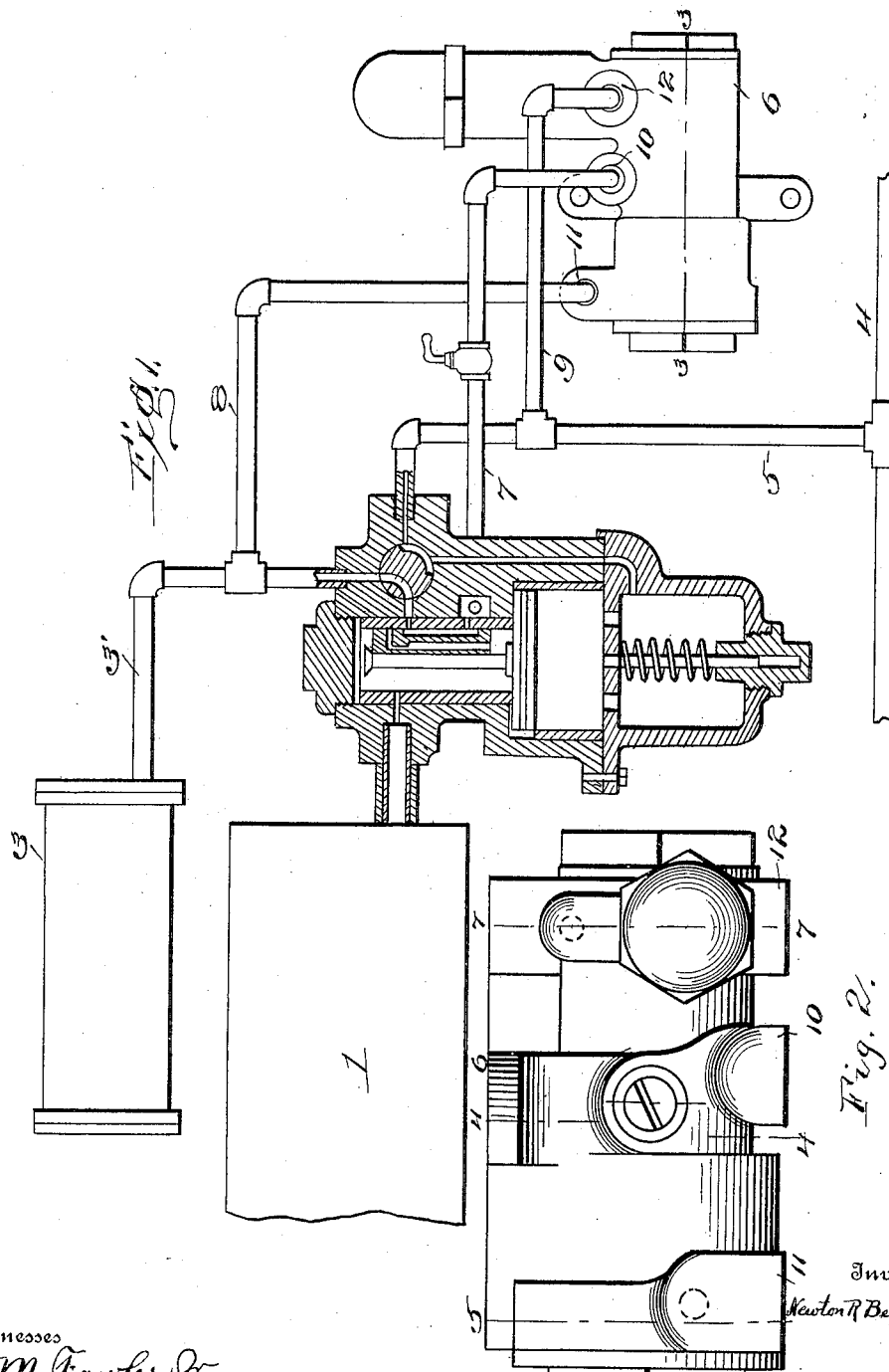

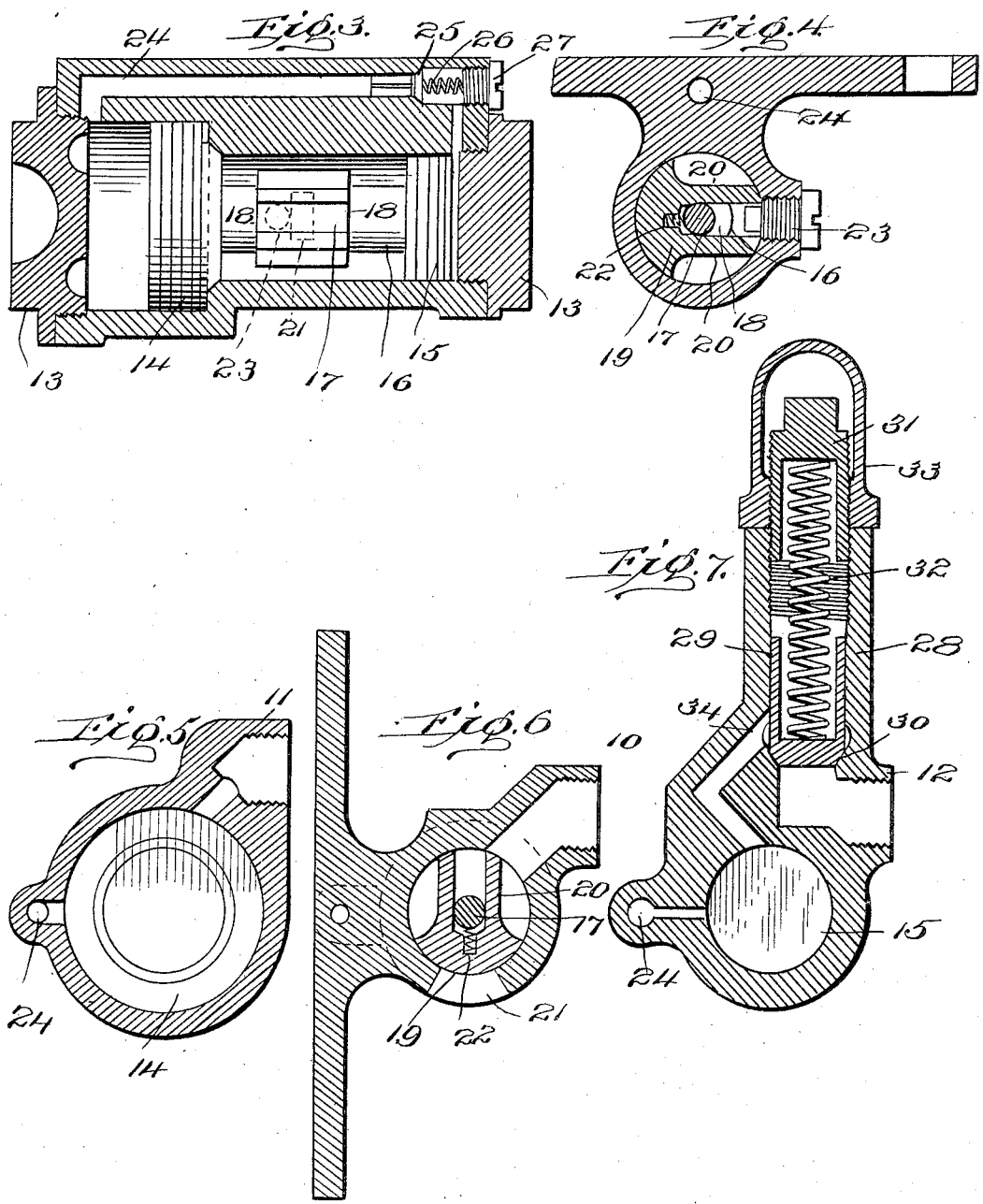

UNITED STATES PATENT OFFICE.

NEWTON R. BEAUCHAMP, OF ATLANTA, GEORGIA.

AIR-BRAKE SYSTEM.

No. 828,635.  Specification of Letters Patent.  Patented Aug. 14, 1906.

Application filed April 20, 1906. Serial No. 312,872.

*To all whom it may concern:*

Be it known that I, NEWTON R. BEAU-CHAMP, a citizen of the United States, residing at Atlanta, in the county of Fulton and State of Georgia, have invented certain new and useful Improvements in Retaining-Valves for Air-Brake Systems; and I do hereby declare the following to be a full, clear, and exact description of the invention, such as will enable others skilled in the art to which it appertains to make and use the same.

This invention relates to improvements in air-brake systems, and more particularly to a retaining-valve therefor.

The object in view is the accomplishment of the retaining of pressure in the brake-cylinder during the recharging of the auxiliary reservoir, the construction and operation of the retaining-valve being comparatively simple.

With this and further objects in view the invention comprises certain novel constructions, combinations, and arrangement of parts, as will be hereinafter fully described and claimed.

In the accompanying drawings, Figure 1 is an outline view of a portion of an air-brake system including the present retaining-valve, the triple valve of the system being illustrated in longitudinal section. Fig. 2 is a top plan view of the retaining-valve detached. Fig. 3 is a longitudinal horizontal central section taken on a plane of line 3 3 of Fig. 1, the exhaust-controlling valve and pistons being illustrated in elevation. Fig. 4 is a transverse vertical section taken on a plane of line 4 4 of Fig. 2. Fig. 5 is a transverse section taken on a plane of line 5 5 of Fig. 2. Fig. 6 is a transverse section taken on a plane of line 6 6 of Fig. 2. Fig. 7 is a transverse section taken on a plane of line 7 7 of Fig. 2.

Referring to the drawings by numerals, 1 indicates the ordinary auxiliary reservoir, which is in communication with the triple valve 2 of the usual type. The valve 2 in turn is in communication with the brake-cylinder 3 through pipe 3', which brake-cylinder is also of the usual type. The train-pipe 4 leads from the main reservoir and communicates with the triple valve 2 by a connecting-pipe 5. The retaining-valve, indicated by the general reference-numeral 6 is provided with connecting-pipes for governing the exhaust from the cylinder 3, such pipes consisting of a pipe 7, leading from the exhaust-port of the triple valve, a pipe 8, leading from the pipe 3' and a pipe 9, leading from the pipe 5. The pipe 7 communicates with the port 10 in valve 6, pipe 8 communicates with port 11 of said valve, and pipe 9 communicates with port 12 of the said valve. The casing of the valve 6 is formed with a longitudinal cylindrical bore enlarged at one end and of reduced diameter throughout the remainder of its length. For the facilitating of the assemblage of the parts the bore is closed at its opposite ends by means of removable threaded plugs 13 13. Within the enlarged portion of the bore is arranged a piston 14, and within the reduced portion is arranged a piston 15, the piston-heads 14 and 15 being connected by a piston-rod 16. The rod 16 is preferably formed intermediate of its length with a reduced portion 17, forming annular shoulders 18 18 at its ends.

A segmental valve 19 is arranged within the smaller portion of the bore in the casing and is formed with parallel arms 20 20, extending on opposite sides of the reduced portion 17, said arms being of a width sufficient to fit snugly between the shoulders 18, so that said valve is designed to be moved longitudinally of the casing when the pistons 14 and 15 are moved. Centrally of the casing, as seen in full lines of Fig. 6 and in dotted lines of Fig. 3, is an exhaust-port 21, which is adapted to be closed by the valve 19 when the parts are in the position indicated in Fig. 3. In order to insure retention of the valve 19 against the wall of the bore, a spring 22 is seated in the valve and bears at its free end against the reduced portion 17, so as to exert a radial pressure on the valve. In order to prevent rocking of the valve or rotary movement thereof, a bolt 23 is threaded through the casing and extends between the arms 20, the said arms being of sufficient width to prevent their escape from the bolt 23 by the longitudinal thrust of the piston 16.

The port 10 leads to the reduced portion of the bore in the valve-casing between piston-heads 14 and 15, so that when the valve 19 is off of port 21 and the parts are in the position indicated in Fig. 1 the exhaust will be opened.

The port 11 leads to the enlarged portion of the bore in front of the piston-head 14. A longitudinal port 24 leads from the enlarged portion of the bore longitudinally of the valve-casing and communicates with the smaller portion of the bore between the piston-head 15 and the plug 13. For purposes hereinafter specified a check-valve 25 is interposed in the length of the port 24 and positioned for permitting fluid under pressure to pass from the enlarged portion of the bore to the reduced portion thereof, but designed to prevent a return movement of such fluid. The valve 25 is preferably pressed by spring 26, interposed between said valve and the plug 27, threaded into the opening formed at the point of turning of the by-pass 24. The plug 27 is employed, preferably, as a means for facilitating access to the check-valve for the purpose of repair and for facilitating assemblage.

The port 12 communicates with a laterally-disposed chamber 28, within which is arranged a valve 29, designed to rest normally on the seat 30, and when seated normally prevents admission of fluid under pressure through the port 12. A plug 31 is threaded into the upper end of the chamber 28, and a spring 32 is interposed between the plug and the valve 29, the said spring serving to retain the valve upon its seat. It is to be observed that by threading the plug 31 longitudinally of the chamber 28 in one direction or the other the tension of the spring 32 may be increased or diminished for determining the degree of pressure required for elevating the valve 29. By preference a cap 33 is threaded onto the plug 31 until the same engages the outer open end of the chamber 28, the said cap 33 thus serving to aid in locking the plug against undesirable rotation. A port 34 leads from the chamber 28 to a point between the piston-head 15 and the corresponding plug 13.

In operation the train-pipe 4 is of course normally supplied with pressure which maintains the triple valve 2 in position for permitting exhaust from cylinder 3. When it is desired to apply the brake, the engineer turns the handle of his valve for exhausting pressure from pipe 4, which permits the piston in the valve 2 to drop, cutting off the exhaust from cylinder 3 and opening communication of auxiliary reservoir 1 with said cylinder. Immediately pressure from the cylinder 3 is admitted through pipe 8 to port 11 of the retaining-valve and acts upon piston-head 14. At the same time pressure is admitted through port 24 to the opposite side of piston-head 15, and the pressure between the piston-head 15 and the plug 13 serves as a cushion, the greater area of the piston-head 14 permitting the piston to be thrown to a position for causing the valve 19 to close the port 21. Under normal conditions the application of the brake by the pressure supplied from auxiliary tank 1 will be sufficient, and it is only necessary for the engineer to throw his valve to a position for supplying a high pressure from the main pump-reservoir to the train-pipe 4 in order to exhaust the pressure from the cylinder 3. When the engineer's valve is adjusted for permitting pressure from the main or pump reservoir to be admitted through pipe 4, the pressure enters the triple valve 2, throwing the piston thereof in position for exhausting cylinder 3. The high pressure at the same time enters through pipe 9 into the port 12. The pressure is sufficiently high to lift the valve 29 from its seat, and the pressure is thus enabled to pass through port 34 to the piston-head 15. The check-valve 25 prevents the high pressure from passing through port 24, and therefore the high pressure is acting upon piston-head 15, while only the low pressure acts upon the piston-head 14. The piston-heads therefore move to the opposite end of the valve-casing from that indicated in Fig. 3, and the valve 19 moves off from the port 21 and leaves the same open for permitting exhaust from the brake-cylinder 3. In this condition the parts are ready for a second application of the brake, pressure being admitted past the leakage-groove provided in the triple valve for supplying the auxiliary reservoir 1. Now assuming that the train is on a grade, after the first application of the brakes through leakage the pressure of the auxiliary reservoir 1 is not sufficient for continuously maintaining the brakes applied, and it therefore becomes necessary to recharge the said auxiliary reservoir. To accomplish this result, it is only necessary for the engineer to admit pressure to pipe 4 of lower degree than that admitted for exhausting the cylinder 3—that is, the engineer's valve is placed in running position. The lower pressure will be sufficiently high to charge the chamber 1, but will not be sufficiently high to lift the valve 29. The lower pressure of course is admitted through the pipe 9 to the valve 29, but as it is not of sufficiently high degree to overcome the pressure of the spring 32 the parts in the retaining-valve remain with the exhaust-port closed. The pressure from the pipe 4 further acts upon the piston within the triple valve and lifts the same to a position for exhausting cylinder 3; but the exhaust cannot occur, as the exhaust-port 21 of the retaining valve is closed. Pressure is admitted past the leakage-groove of the triple valve into the auxiliary reservoir until the auxiliary reservoir is sufficiently charged, whereupon the pressure is exhausted by operation of the engineer's valve from the pipe 4, which causes the piston within the triple valve to drop to a position for admitting the pressure from the auxiliary reservoir to the cylinder 3. The time required for the recharging of the auxiliary reservoir is not sufficient for permitting material decrease in the pressure in cylinder 3, and therefore the brakes are retained in their applied condition. When it is desired to release the brakes after the renewal of the pressure in the auxiliary reservoir, it is only necessary for the engineer to turn his valve to a position for supplying the main or pump reservoir pressure directly to the pipe 4, such pressure being of sufficiently high degree to elevate the valve 29 and throw the piston 15 for opening the exhaust-port 21. At the same time the high pressure will act upon the piston within the triple valve and open the exhaust between the cylinder 3 and the pipe 7.

Having thus fully described my invention, what I claim as new, and desire to secure by Letters Patent, is—

1. A retaining-valve for an air-brake system, comprising a casing, a double piston arranged therein, a port being formed in the wall of the casing for affording communication between the chambers of the two pistons, an exhaust-controlling valve connected with said pistons and a check-valve interposed in said port.

2. A retaining-valve for an air-brake system, comprising a casing formed with a longitudinal bore, having an enlarged and a reduced portion, a piston arranged in said enlarged portion, a piston in the reduced portion, a piston-rod connecting said pistons, an exhaust-controlling valve connected with said piston-rod, a port being formed in the wall of the casing for affording communication between the enlarged portion of the bore and the reduced portion thereof, and means for preventing communication from the reduced portion to the enlarged portion.

3. A retaining-valve for an air-brake system, comprising a casing formed with an enlarged piston-chamber and a reduced piston-chamber, a piston-head in each of said chambers, a piston-rod connecting said piston-heads, means of communication being provided between said enlarged and reduced chambers, means for preventing communication between the reduced and the enlarged portions, means for supplying a relatively low pressure to the enlarged chamber, means for supplying a relatively high pressure to the reduced chamber, and an exhaust-controlling valve arranged to be operated by said pistons.

4. A retaining-valve for an air-brake system, comprising a casing, a piston-rod arranged therein, the said casing being formed with an exhaust-port, a segmental valve designed to be moved to a position for closing said port, means connecting the valve with said piston, means for moving the piston longitudinally within the casing for controlling the exhaust, and means for preventing rotary movement of the exhaust-valve.

5. A retaining-valve for an air-brake system, comprising a casing, pistons arranged therein and adapted to be moved longitudinally thereof, a piston-rod connecting said pistons, the valve-casing being formed with an exhaust-port between the pistons, an exhaust-valve disposed within the casing between the pistons, means for connecting the same to the piston-rod for causing the exhaust-valve to be moved relative to the movement of the pistons, and means for preventing lateral movement of the exhaust-valve.

6. A retaining-valve for an air-brake system, comprising a casing, pistons arranged therein and adapted to be moved longitudinally thereof, a piston-rod connecting said pistons, the casing being formed with an exhaust-port between the pistons, an exhaust-controlling valve interposed between the pistons, arms extending from said valve and engaging the piston-rod for causing the exhaust-controlling valve to be moved with the movement of the pistons, and means carried by said casing and extending between said arms for preventing lateral movement of the exhaust-controlling valve.

7. A retaining-valve for an air-brake system, comprising a casing, pistons movable longitudinally therein, a piston-rod connecting said pistons, the casing being formed with an exhaust-port between the pistons, an exhaust-controlling valve interposed between the pistons, means connected with the valves and partially inclosing the piston-rod and engaging the same for causing the exhaust-controlling valve to travel with the piston-rod and a spring interposed between the exhaust-controlling valve and the piston-rod.

8. In an air-brake system, the combination with a train-pipe adapted to supply pressure at different degrees, and to exhaust pressure, an auxiliary reservoir adapted to be supplied with pressure from said train-pipe, a brake-cylinder designed to be supplied with pressure from said auxiliary reservoir, and a triple valve controlling the admission of pressure to and the exhausting of pressure from the auxiliary reservoir and the brake-cylinder, of a retaining-valve casing provided with a plurality of ports, a pipe leading from the exhaust of the triple valve to one of the ports of said casing, a pipe leading from the pipe communicating with the brake-cylinder to another of the ports of said casing, and a pipe leading from the train-pipe to a third port in said casing, said casing being formed with an exhaust-port adapted normally to be in communication with the port with which the pipe from the triple-valve exhaust is connected, a valve adapted to close the exhaust-port of the retaining-valve casing, piston-heads arranged within the retaining-valve casing, a piston-rod connecting said heads, means connecting said piston-rod with said exhaust-valve for causing movement of the valve relative to the movement of the piston-heads, the port connected with the pipe leading from the brake-cylinder being in communication with one side of one of the pistons, the port connected with the pipe in communication with the train-pipe being in communication with the opposite side of the opposite piston, and a spring-pressed valve controlling the admission of pressure from the train-pipe to the last-mentioned piston.

9. A retaining-valve for an air-brake system, comprising a casing, a pair of pistons arranged therein, a piston-rod connecting the same, an exhaust-valve controlled by the movement of said pistons, means for admitting brake-pressure to one of the pistons, means for admitting train-line pressure to the other of said pistons, and a spring-pressed valve normally controlling the admission of train-line pressure.

10. A retaining-valve for an air-brake system, comprising a casing, a pair of pistons arranged therein, an exhaust-valve controlled by said pistons, means for admitting brake-pressure to one of said pistons, means for admitting train-line pressure to the other of said pistons, a spring-pressed valve controlling the admission of train-line pressure, and means for varying the tension of the spring of said valve.

11. A retaining-valve for an air-brake system, comprising a casing, pistons arranged therein adapted to control the exhaust from the brake-cylinder of the system, means for admitting brake-pressure to one of said pistons, means for admitting train-line pressure to the other of said pistons, a valve controlling the admission of train-line pressure, a spring normally pressing said valve to its seat, and a plug threaded into engagement with said spring and adapted to be threaded longitudinally for varying the tension of the spring.

12. A retaining-valve for an air-brake system, comprising a casing, a pair of pistons arranged therein and adapted to control the exhaust from the brake-cylinder of said system, means for supplying pressure of different degrees to the different pistons, a port being provided for affording communication between that portion of the casing containing one of the pistons and that portion of the casing containing the other of the pistons, a check-valve normally preventing return communication, a plug threaded into an opening communicating with said port, and a spring interposed between the plug and the check-valve.

In testimony whereof I affix my signature in presence of two witnesses.

NEWTON R. BEAUCHAMP.

Witnesses:
  JOHN L. FLETCHER,
  EDGAR M. KITCHIN.